US009811723B2

(12) United States Patent
Rosset et al.

(10) Patent No.: US 9,811,723 B2
(45) Date of Patent: Nov. 7, 2017

(54) METHOD OF AUTHENTICATING AND/OR IDENTIFYING A SECURITY ARTICLE

(75) Inventors: Henri Rosset, Le Pin (FR); Philippe Dietemann, Saint-Martin-d'Heres (FR)

(73) Assignee: ARJOWIGGINS SECURITY, Boulogne Billancourt (FR)

( * ) Notice: Subject to any disclaimer, the term of this patent is extended or adjusted under 35 U.S.C. 154(b) by 624 days.

(21) Appl. No.: 13/806,734

(22) PCT Filed: Jun. 22, 2011

(86) PCT No.: PCT/IB2011/052741
§ 371 (c)(1), (2), (4) Date: Mar. 8, 2013

(87) PCT Pub. No.: WO2011/161635
PCT Pub. Date: Dec. 29, 2011

(65) Prior Publication Data
US 2013/0169677 A1 Jul. 4, 2013

(30) Foreign Application Priority Data
Jun. 22, 2010 (FR) ..................................... 10 54932

(51) Int. Cl.
*G09G 5/00* (2006.01)
*G06K 9/00* (2006.01)
(Continued)

(52) U.S. Cl.
CPC ......... *G06K 9/00442* (2013.01); *B41M 3/148* (2013.01); *B42D 25/00* (2014.10);
(Continued)

(58) Field of Classification Search
None
See application file for complete search history.

(56) References Cited

U.S. PATENT DOCUMENTS

| | | | |
|---|---|---|---|
| 1,479,437 | A | 1/1924 | Webster |
| 2,021,141 | A | 11/1935 | Boyer |

(Continued)

FOREIGN PATENT DOCUMENTS

| | | | |
|---|---|---|---|
| CA | 2 471 379 | A1 | 7/2003 |
| CA | 2695824 | A1 | 2/2009 |

(Continued)

OTHER PUBLICATIONS

International Search Report for International Application No. PCT/IB2011/052741 dated Nov. 16, 2011.

(Continued)

*Primary Examiner* — M Good Johnson
(74) *Attorney, Agent, or Firm* — Jones Robb, PLLC

(57) ABSTRACT

A method of authenticating and/or identifying a security article including a first image includes superimposing at least partially the first image of the article with a second image. The second image may be produced by an electronic imager. The method further includes performing a relative movement between the first and second images so as to make it possible to observe an item of information relating to authentication and/or identification of the security article during the relative movement between the first and second images.

19 Claims, 8 Drawing Sheets

Figure 1:
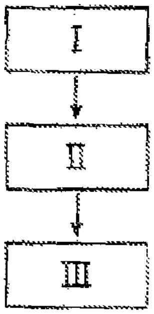

(51) Int. Cl.

| | |
|---|---|
| ***B41M 3/14*** | (2006.01) |
| ***G07D 7/12*** | (2016.01) |
| ***G07D 7/128*** | (2016.01) |
| ***B42D 25/41*** | (2014.01) |
| ***B42D 25/43*** | (2014.01) |
| ***B42D 25/29*** | (2014.01) |
| ***B42D 25/355*** | (2014.01) |
| ***B42D 25/00*** | (2014.01) |
| ***B42D 25/333*** | (2014.01) |
| ***B42D 25/305*** | (2014.01) |
| ***B42D 25/351*** | (2014.01) |
| ***G07D 7/00*** | (2016.01) |
| ***G07D 7/01*** | (2016.01) |
| ***G07D 7/207*** | (2016.01) |
| *B42D 25/382* | (2014.01) |
| *B42D 25/346* | (2014.01) |
| *B42D 25/387* | (2014.01) |
| *B42D 25/391* | (2014.01) |

(52) U.S. Cl.

CPC ........... *B42D 25/29* (2014.10); *B42D 25/305* (2014.10); *B42D 25/333* (2014.10); *B42D 25/351* (2014.10); *B42D 25/355* (2014.10); *B42D 25/41* (2014.10); *B42D 25/43* (2014.10); *G07D 7/003* (2017.05); *G07D 7/01* (2017.05); *G07D 7/12* (2013.01); *G07D 7/128* (2013.01); *G07D 7/207* (2017.05); *B42D 25/346* (2014.10); *B42D 25/382* (2014.10); *B42D 25/387* (2014.10); *B42D 25/391* (2014.10); *B42D 2033/04* (2013.01); *B42D 2033/06* (2013.01); *B42D 2033/10* (2013.01); *B42D 2033/16* (2013.01); *B42D 2033/20* (2013.01); *B42D 2033/22* (2013.01); *B42D 2033/26* (2013.01); *B42D 2033/46* (2013.01); *B42D 2035/14* (2013.01); *B42D 2035/16* (2013.01); *B42D 2035/24* (2013.01); *B42D 2035/36* (2013.01)

(56) References Cited

U.S. PATENT DOCUMENTS

| | | | | |
|---|---|---|---|---|
| 5,118,526 | A | 6/1992 | Allen et al. | |
| 5,303,370 | A * | 4/1994 | Brosh et al. | 380/51 |
| 5,712,731 | A * | 1/1998 | Drinkwater et al. | 359/619 |
| 5,793,502 | A | 8/1998 | Bianco et al. | |
| 5,862,218 | A * | 1/1999 | Steinberg | 713/176 |
| 5,901,484 | A | 5/1999 | Seder | |
| 5,995,638 | A | 11/1999 | Amidror et al. | |
| 6,222,650 | B1 * | 4/2001 | Long | 359/2 |
| 6,286,873 | B1 | 9/2001 | Seder | |
| 6,467,810 | B2 | 10/2002 | Taylor et al. | |
| 6,980,654 | B2 * | 12/2005 | Alasia et al. | 380/216 |
| 7,151,541 | B2 | 12/2006 | Seder | |
| 7,654,580 | B2 | 2/2010 | Alasia et al. | |
| 8,284,492 | B2 * | 10/2012 | Crane et al. | 359/620 |
| 8,488,242 | B2 * | 7/2013 | Hill et al. | 359/566 |
| 8,682,025 | B2 * | 3/2014 | Cvetkovic | G06K 9/6217 382/100 |
| 8,778,481 | B2 * | 7/2014 | Kaule et al. | 428/195.1 |
| 8,792,674 | B2 * | 7/2014 | Slobodan | G09C 5/00 358/3.28 |
| 2008/0037131 | A1 * | 2/2008 | Steenblik | B44F 1/10 359/619 |
| 2009/0008923 | A1 * | 1/2009 | Kaule | B42D 25/00 283/67 |
| 2011/0187747 | A1 | 8/2011 | McCarthy et al. | |
| 2013/0163818 | A1 | 6/2013 | Rosset et al. | |
| 2014/0334665 | A1 * | 11/2014 | Quinn | G06T 1/0085 382/100 |

FOREIGN PATENT DOCUMENTS

| | | | |
|---|---|---|---|
| EP | 0 203 499 | A2 | 12/1986 |
| EP | 0 229 645 | A1 | 7/1987 |
| GB | 1 552 853 | A | 9/1979 |
| GB | 2 444 966 | A | 6/2008 |
| WO | WO-98/15418 | A1 | 4/1998 |
| WO | WO-99/37488 | A1 | 7/1999 |
| WO | WO-02/17242 | A1 | 2/2002 |
| WO | WO-2004/096482 | A1 | 11/2004 |
| WO | WO-2005/106808 | A1 | 11/2005 |
| WO | WO-2006/018171 | A2 | 2/2006 |
| WO | WO-2006/029744 | A1 | 3/2006 |
| WO | WO-2008/006983 | A1 | 1/2008 |
| WO | WO-2009/019038 | A1 | 2/2009 |
| WO | WO-2009/062229 | A1 | 5/2009 |

OTHER PUBLICATIONS

Written Opinion for International Application No. PCT/IB2011/052741 dated Dec. 22, 2012.

International Search Report for International Application No. PCT/IB2011/052742 dated Oct. 19, 2011.

Written Opinion for International Application No. PCT/IB2011/052742 dated Dec. 22, 2012.

Non Final Rejection dated Jan. 27, 2015 from U.S. Appl. No. 13/806,742.

Final Rejection dated May 7, 2015 from U.S. Appl. No. 13/806,742.

* cited by examiner

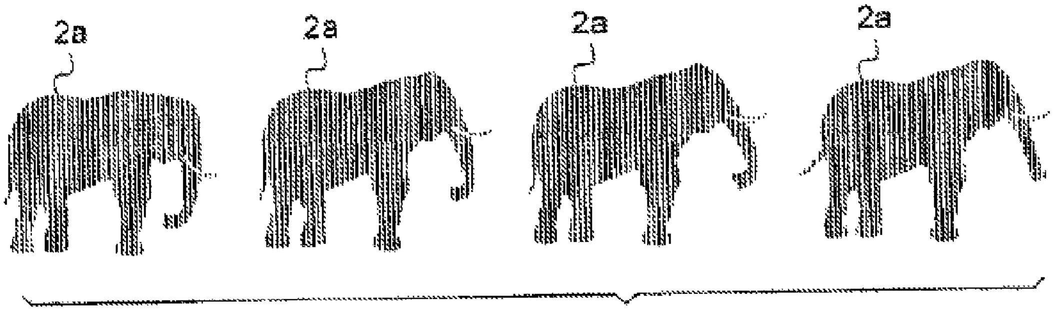
Fig.7
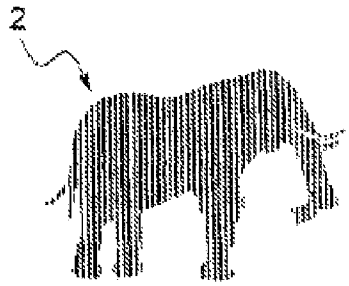
Fig.8
Fig.9
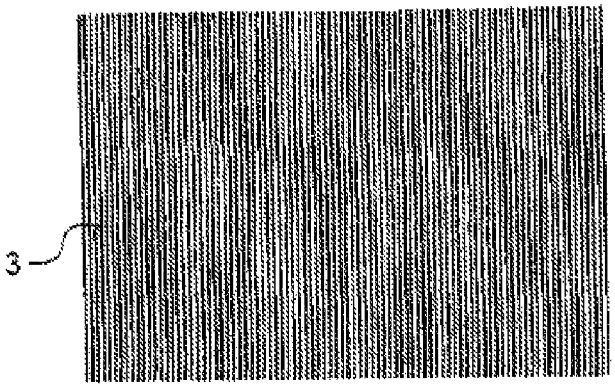
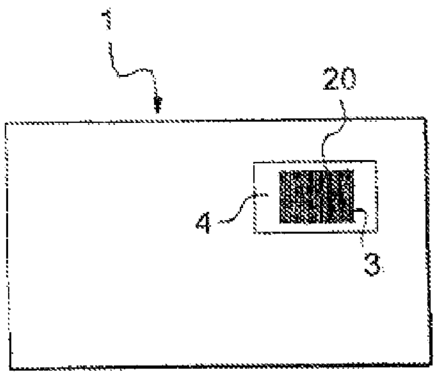
Fig.10
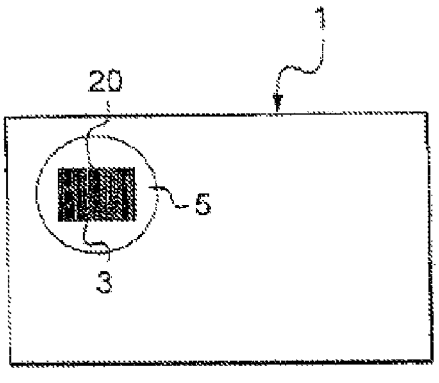
Fig.11

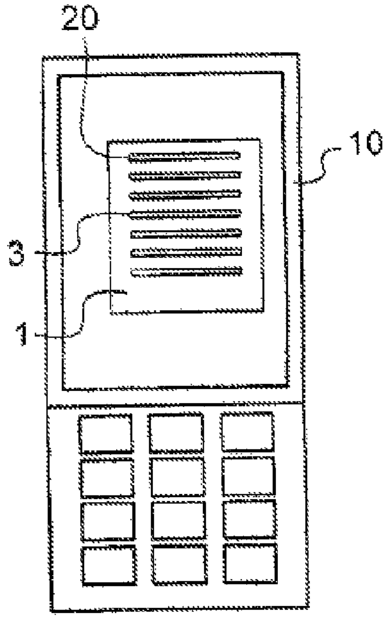
Fig.19
Fig.20
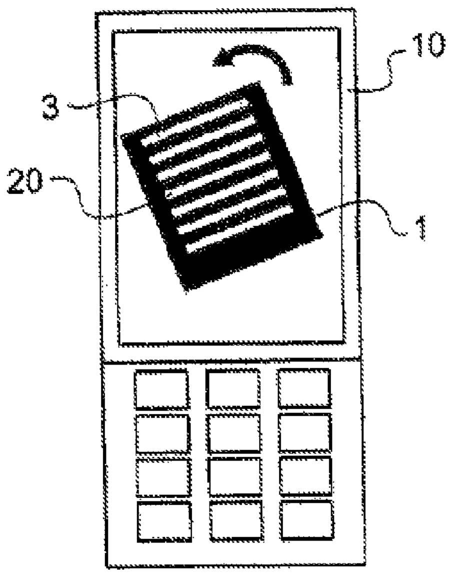
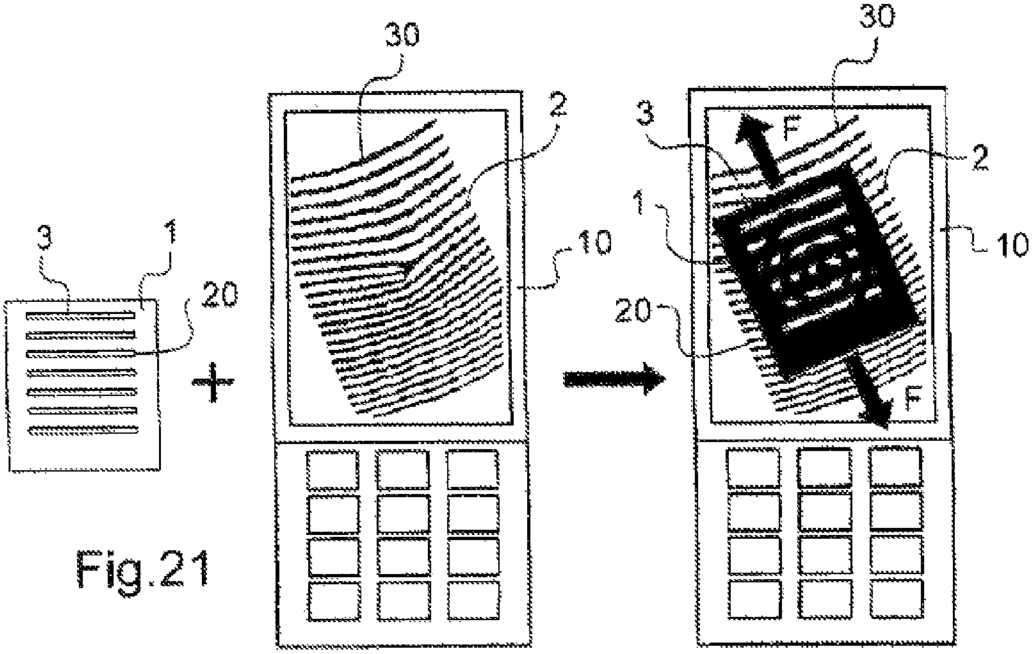
Fig.21

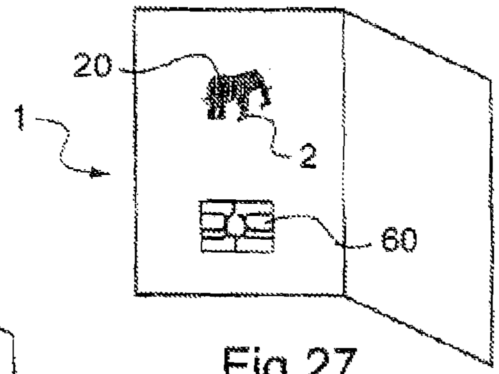
Fig.27
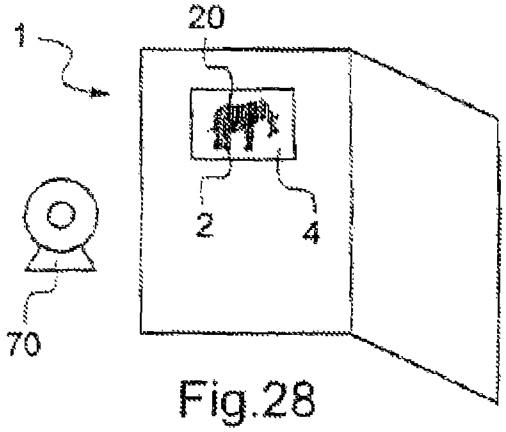
Fig.28
Fig.29
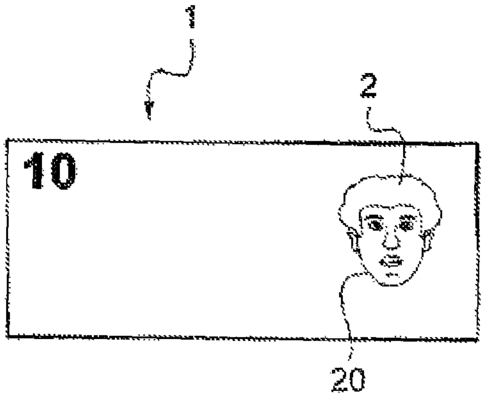
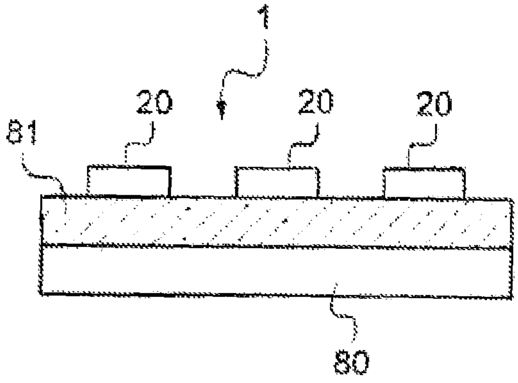
Fig.30
Fig.31
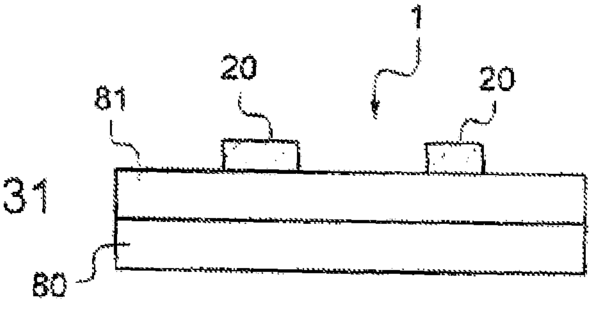

METHOD OF AUTHENTICATING AND/OR IDENTIFYING A SECURITY ARTICLE

This is a national stage application of PCT/IB2011/052741, filed internationally on Jun. 22, 2011, which claims priority to French Application No. FR 1054932, filed Jun. 22, 2010.

The present invention pertains to the field of security articles, and especially security documents.

BACKGROUND

Methods relying on retinal persistence to allow the reconstruction of motion are known from the prior art. The phenakistiscope is known for example, which uses a cardboard disk, pierced with slits, wherein a motion is decomposed into a series of still images, and a stick enabling it to be held while it is rotating. The zoetrope is also known, which consists of a drum pierced with slits on its upper half and sheltering in the interior, in its lower part, a strip of drawings decomposing a motion. When the drum is rotated and the interior is stared at fixedly through the slits, the drawings are animated. The praxinoscope is also known, the operation of which relies on the principle of the zoetrope, which comprises several mirrors around its central axis so as to view the illusion of motion.

Furthermore, methods are known, described in documents U.S. Pat. No. 5,901,484, U.S. Pat. No. 6,286,873 and US 2005/0183300, for creating illusions of motion. These methods utilize the principle of decomposition of motion allowing the reconstruction of a motion "in frames". A support carries several fragmented images, corresponding for example to the decomposition of an object or of an animal in motion, and a carrier transparent film bearing a network of parallel lines having a given thickness and spacing between the lines is placed on the support. A relative motion between the fragmented images and the network of parallel lines makes it possible to create the illusion of a motion.

The superposition of two elements, by folding of an article, is also known. Application WO 2006/029744 describes in particular the superposition, by folding of a document, of two optical elements making it possible to obtain different optical effects according to the distance separating said optical elements. Moreover, application WO 02/17242 describes the superposition, by folding of an article, of a hologram and of a hidden information item so as to reveal said hidden information item. Finally, application US 2006/0290136 describes the superposition, by folding of a document, of a coded image and of an optical lens to decode said image.

A method for identifying a document, for example a banknote, is furthermore known from application WO 2005/106808, consisting in superimposing a region of the document on an image displayed on a screen, the image arising from a decoding system dispatched via a network.

Further, a security element is known from application WO 2006/018171 comprising authentication characteristics exhibiting a first appearance in transmitted light and a second appearance, different from the first, when the security element is placed on a particular background, for example a liquid crystal display (LCD).

Also known is application DE 10 2007 037576 which describes a banknote comprising an at least partially transparent window in which appears a first hidden information part, and a liquid crystal display displaying a second hidden information part. The superposition of the first and second hidden-information parts makes it possible to reveal a recognizable information item. The screen can also make it possible to successively display various hidden-information parts which make it possible to successively observe various recognizable items of information when the banknote is superimposed on the screen.

SUMMARY

A need exists to further enhance security and processes for authenticating and/or identifying security articles, so as especially to increase the difficulty of counterfeiting these articles.

A need also exists to provide a method for authenticating and/or identifying security articles which is simple to implement for the man in the street, especially with the aid of the technological tools at his disposal.

The invention thus proposes according to one of its aspects to utilize the principle of motion decomposition, set forth previously, so as to be able to authenticate and/or identify security articles by viewing decomposed motions, thus bringing about an illusion of motion.

The subject of the invention is thus, according to one of its aspects, a method for authenticating and/or identifying a security article, especially a security document, comprising a first image, the method comprising the steps consisting in:

superimposing at least partially the first image of the article with a second image produced by an electronic imager, performing a relative motion between the first and second images so as to make it possible to observe an authentication and/or identification information item for the security article during the relative motion between the first and second images.

By virtue of the invention, it is possible to benefit from a method allowing the authentication and/or the identification of a security article by virtue of the reconstruction of an authentication and/or identification information item during the relative motion of the first and second images.

It is still possible to confer a recreational and/or attractive effect for the user of the security article by the way in which a hidden information item is revealed, for example by an effect of motion or of animation.

During the relative motion between the first and second images, an effect of motion or of animation may be observed, especially an effect of motion or of animation of interleaved images. In particular, the authentication and/or identification information item can comprise an animation effect obtained on the basis of several interleaved images of the first image and/or of the second image. Thus, the relative motion alone between the first and second images can make it possible to observe the animation of the various interleaved images. The simple superposition without motion of the first and second images one on the other may make it impossible to observe an animation effect but only a static image.

The relative motion between the first and second images may be a physical motion between the article and the electronic imager, that is to say correspond to a real displacement between the article and the electronic imager. As a variant, the relative motion between the first and second images can correspond to the displacement of one image with respect to the other, the article and the electronic imager being especially fixed with respect to one another.

The authentication and/or identification information item may advantageously not be accessible, especially not be visible, for example to the naked eye or with an arbitrary device, otherwise than during the relative motion of the first and second images. The authentication and/or the identification of the security article can thus result only from observation of the security article during the relative motion of the first and second images.

The security article can comprise a window, for example an at least partially transparent or translucent window, comprising the first image.

Exemplary embodiments of security windows in security articles are for example described in the publications GB 1 552 853, which discloses the creation of a window especially by transparentization, laser cutting, mechanical abrasion or incision, EP 0 229 645 which describes the creation in the wet phase of a window on one face or both faces of a twinply paper, WO 2004/096482 which describes the creation of a window by laser cutting, CA 2 471 379 which describes the creation of a transparent window and association with a security element and WO 2008/006983 which describes the creation of a transparent window on a twinply paper.

The first image can appear on a zone of reduced opacity of the security article. Such a zone of reduced opacity can especially correspond to a zone of lesser thickness, to a zone rendered transparent or to a zone comprising at least one layer of a material of lesser opacity. The opacity of said reduced opacity zone will in particular be sufficiently low to allow observation in transmission of the first image. Preferably, the image is visible in transmission and in reflection.

The first image can appear on an at least partially transparent or translucent zone of the security article.

When the electronic imager produces the second image by means of polarized light, the first image preferably appears on an at least partially transparent or translucent zone, especially an at least partially transparent window.

The second image produced by the electronic imager may be displayed on the electronic imager, for example on a screen of the electronic imager.

As a variant, the second image may be projected by the electronic imager, for example on a background or on the security article. In particular, when the second image is projected on a background, the first image of the security article may be superimposed on the second image projected on the background. As a variant, the second image may be projected at least partially on the first image of the security article.

The relative motion of the first image with respect to the second image can for example be effected in a plane parallel to the plane containing the second image, or vice versa.

The relative motion is preferably a translation, or indeed a rotation or a combination of a translation and of a rotation.

The security article may be folded, a part of the article being fixed with respect to the second image produced by the electronic imager and another part of the article, especially a part comprising the first image, being imbued with a rotational and/or translational motion with respect to the second image produced by the electronic imager.

The security article may be folded and the relative motion may be a motion in the course of which one part of the article is fixed with respect to the electronic imager while the other part of the article is mobile.

The first image of the security article may be displaced in relation to the second image produced by the electronic imager, the latter image being stationary. For example, the electronic imager can display or project the second image, the latter being stationary, and the user superimposes the first image of the security article on the second image and displaces the first image with respect to the second image. The relative motion between the first and the second image thus results from a displacement of the article with respect to the imager.

As a variant, the relative motion between the images is performed without relative motion between the article and the electronic imager. The second image produced by the electronic imager may be displaced by modification of the display or of the projection, in relation to the first image of the security article, the latter image being stationary. For example, the electronic imager can display or project a second image in motion, and the user superimposes the first image on the second image without displacing the first image with respect to the electronic imager.

As a further variant, the display or the projection of the second image is performed in a manner which varies over time so as to generate a relative motion with the first image and the article and the electronic imager are in addition imbued with a relative motion with respect to one another.

The article and the imager may or may not come into contact when the images are superimposed.

The expression "electronic imager" is intended to mean an electronic device making it possible to produce an image by display or projection.

The electronic imager can for example comprise a screen on which the second image is displayed.

The electronic imager can comprise a screen of any known type, for example a screen of a computer, of a television, of a mobile telephone, of an electronic book or diary, of a Personal Digital Assistant, of a watch dial, this list being nonlimiting.

The electronic imager may be a projector, devoid or not of a screen onto which the projection is performed. The projector can make it possible to project the second image onto a background or onto the security article.

The electronic imager can for example be a projector of any known type, for example a projector for transparencies, a videoprojector, a backprojector, a picoprojector or nanoprojector, for example a miniaturized videoprojector integrated into a portable apparatus (PDA, mobile telephone, laptop computer, for example), a cinematographic projector, this list being nonlimiting.

The electronic imager makes it possible preferably to generate a pixelized image, each pixel of which is individually addressable, preferably with at least 256 gray levels or colors, of resolution lying between 50 and 1000 dpi ("Dots Per Inch").

The electronic imager may be a projector projecting visible, infrared (IR) and/or ultra-violet (UV) light.

The first image can for example be produced at least partially with the aid of a visible and/or luminescent ink, for example a fluorescent and/or phosphorescent ink.

The electronic imager can comprise a screen of the LCD ("Liquid Crystal Display"), LED ("Light Emitting Diode"), OLED ("Organic Light Emitting Diode"), laser, plasma, electrochromic, FED ("Field Emission Display"), SED ("Surface-conduction Electron-emitter Display"), LCOS ("Liquid Crystal On Silicon") type or else a cathode ray tube.

The electronic image preferably comprises a liquid crystal display (LCD).

The screen can exhibit a resolution of between 50 and 600 dpi, better still between 100 and 300 dpi, for example equal to 160 dpi.

The first image and/or the second image can exhibit polarization properties.

For example, the second image may be produced by the electronic imager by means of polarized light, especially rectilinearly, circularly or elliptically polarized light. The electronic imager may comprise a screen emitting polarized light or may project polarized light.

The security article can comprise a polarizing filter. In particular, the first image may be produced with the aid of a polarizing filter.

The first image may be produced according to at least one of the following steps:

- production of one or more perforations in at least one polarizing filter to form the first image,
- local heating of at least one polarizing filter, for example with the aid of a laser, so as to locally suppress the polarizing properties of the filter and to form the first image,
- selective application, for example by printing and/or gluing, to at least one polarizing filter, of a diffusing material, for example a colloidal silica and/or an adhesive strip, to form the first image,
- carrying out of at least one selective attack by chemical reaction and/or by emission of luminous radiation, especially ultra-violet (UV) and/or infrared (IR) and/or laser radiation, on at least one polarizing filter, optionally with the aid of a mask, to form the first image, in such a way especially as to locally cancel the polarizing effect of the filter,
- application, especially by printing or by coating, of at least one polarizing effect, especially of a polarizing compound, for example with the aid of an ink comprising said polarizing compound, to a given non-polarizing substrate, especially a polymer film, to form the first image,
- application, especially by printing or by coating, of at least one composition comprising cholesteric liquid crystals, for example such as that marketed by the company SICPA under the brand name Oasis®, to a given polarizing substrate, especially a polymer film, to form the first image.

By way of remark, depending on the effect desired, the previously stated steps will be carried out so as to form an image which is the image in positive or in negative of the first image. In particular, it is possible to apply locally to at least one polarizing filter, for example by printing, a polyether based aliphatic polyurethane, for example such as that marketed by the company LAMBERTI under the brand name Esacote® PU 21/S.

In the last possibility mentioned hereinabove, when during the implementation of the method according to the invention, the composition comprising cholesteric liquid crystals is situated between the polarizing substrate and the electronic imager, the cholesteric liquid crystals modify the polarized light of the electronic imager which is not stopped by the substrate and the zones covered with cholesteric liquid crystals appear transparent when the polarizing substrate is oriented so as to be opaque.

On the other hand, when the polarizing substrate is situated between the composition comprising cholesteric liquid crystals and the electronic imager, the cholesteric liquid crystals exhibit an optically variable effect when the polarizing substrate is oriented so as to be opaque. The optically variable effect of the cholesteric liquid crystals is more generally known by the term "colorshift" effect, the color of the cholesteric liquid crystals depending on the angle of observation and the crystals being especially observed on a dark background, preferably black in color. The "colorshift" effect of the cholesteric liquid crystals can constitute an additional security measure for authenticating and/or identifying the security article.

Thus, in particularly preferred examples of implementation of the method according to the invention, the first image is defined by a first polarizing material superimposed on a second polarizing material, the first material extending especially according to patterns corresponding to the first image and the second material extending in a continuous manner. The first material is preferably a printing of cholesteric liquid crystals and the second material is preferably a linearly polarizing substrate.

The expression "patterns corresponding to the first image" is understood to mean that said patterns can form the first image in negative or in positive.

Advantageously, when the first and second images exhibit polarization properties, there exists only a single orientation of one with respect to the other allowing one to partially mask the other. Stated otherwise, there exists only a single orientation of the first image with respect to the second image preventing the ability to observe the second image through the polarizing zones of the first image, or vice versa. Indeed, the first and second images exhibiting polarization properties consist of polarizing zones and of non-polarizing zones. When they are placed in front of a luminous source emitting polarized light, there exists only a single orientation according to which the polarizing zones become opaque.

In particular, there exists for example only a single orientation of the first image in the case where the article comprises a polarizing filter with respect to the second image projected or displayed by the electronic imager by means of polarized light, which allows the polarizing filter to mask the polarized light of the electronic imager. The polarizing filter can appear opaque, especially black in color, only in this, preferably single, orientation of the first image with respect to the second image.

The presence of a single orientation of the first and second images with respect to one another such as described hereinabove can for example make it possible to authenticate and/or to identify the security article according to a first security level, especially through the presence or otherwise of such an orientation allowing one image to mask the other.

When the first and second images are disposed according to said orientation, a relative motion of one with respect to the other can make it possible to observe the information item for authenticating and/or identifying the security article.

According to a variant embodiment, the first image may be printed with a compound, especially liquid crystals, visible solely when placed in front of an electronic imager emitting polarized light, especially a liquid crystal display. Advantageously, the first image is transparent under non-polarized illumination, for example under natural lighting, and is visible solely under illumination polarized with the aid of the electronic imager, thereby affording the security article an additional security measure.

The electronic imager, for example the screen of the electronic imager, and/or the security article can comprise an indicator making it possible to advise the user as regards the way of positioning the first and second images with respect to one another to obtain said orientation, for example a visual datum.

The security article can comprise an integrated microcircuit, for example an RFID chip or an optical chip (activated for example by the light issuing from the electronic imager), able to communicate with the electronic imager so that the latter may produce, especially display and/or project, an information item advising as regards the way of positioning the first and second images with respect to one another to obtain said orientation.

The security article can comprise an integrated microcircuit, for example an RFID chip or an optical chip, able to communicate with the electronic imager so that the latter may produce at least one second image whose association with the first image can make it possible to implement the method according to the invention. In particular, the electronic imager can produce at least one second image associated with a first image of the security article by communication between the electronic imager and the integrated microcircuit.

The electronic imager can furthermore produce at least one second image on the basis of a photo and/or of a video of the security article, especially of the first image of the security article or of an identifier present on the article, for example a logo or a serial number. The photo and/or video may be produced with the electronic imager, an image capture device, for example a digital camera, connected to the electronic imager by a wire-based or non-wire-based link and/or be transferred to the electronic imager, for example from a device for storing data or via a network, such as the Internet.

The second image may be produced solely on the basis of the photo and/or video of the security article, or as a variant, be produced on the basis of the photo and/or video of the security article and of an additional information item, for example an information item present on the security article, on the photo and/or video, input by the user, or else received from a network, for example from a secure server.

The electronic imager can for example comprise a program making it possible to identify the security article, and especially the first image, and to produce, especially to display and/or to project, a second image obtained from a database advising as regards the second image to be used as a function of the security article, especially of the first image.

The electronic imager can produce several second images and/or the security article can comprise several first images, at least one of the second images making it possible to observe the authentication and/or identification information item when superimposed on at least one of the first images according to the method of the invention, or vice versa.

In particular, it can thus be possible to authenticate and/or to identify the security article with various types of electronic imagers.

As a variant, a given electronic imager can make it possible to authenticate and/or to identify security articles of various types, especially comprising different first images.

For example, the first images can be differentiated by their size, their color, their shape, or indeed by the spacing between the frame dots and/or lines or the thickness of the frame dots and/or lines, especially in the case where the first images are revelation frames and/or combined images such as defined hereinafter.

The second images can also be differentiated by their size, their color, their shape, or indeed by the spacing between the frame dots and/or lines or the thickness of the dots and/or lines of frames, especially in the case where the second images are revelation frames and/or combined images such as defined hereinafter, or else indeed by the size of the pixels, the spacing between the pixels or the color of the pixels, especially in the case where the second images are frames formed by the pixels of a screen as described hereinafter.

The electronic imagers can for example be differentiated on account of their brand, their model, their resolution, their type, namely the screen of a computer, of a television or of a telephone, or projector, for example.

The presence of several first images and/or second images can make it possible to authenticate and/or to identify the security article independently of the differences mentioned hereinabove.

The second image produced by the electronic imager can for example originate from a communication network with which the electronic imager communicates, for example a telephone network, the Internet or an internal network, the image being for example downloaded, and/or be supplied with the electronic imager, for example on a data medium, for example a hard disk, a diskette, a USB key, a CD and/or a DVD. The security article can, if appropriate, comprise such a data medium. The data medium can for example be an integrated microcircuit, for example an RFID or optical chip, communicating with the electronic imager.

The security article can comprise a luminescent zone, for example fluorescent and/or phosphorescent, and the electronic imager can project the second image onto the security article under ultraviolet (UV) lighting.

In particular, the first image may be a luminescent printing, for example carried out on a black opaque background of the security article, onto which the second image is projected under UV lighting. The first image is then visible only under UV lighting.

The first image can further be printed on a luminescent background of the security article, so that it is visible under both UV lighting and normal lighting.

The first image may be concealed in a pattern of the security article. It can also be integrated into a pattern of the security article or else constitute at least one part of a pattern of the security article. By way of example, the first image constitutes a part of the hair of a person represented on a banknote.

The first image can comprise a revelation frame and the second image can comprise a combined image comprising at least two interleaved images, the combined image being associated with the revelation frame, or vice versa.

The term “associated” must be understood to mean that the revelation frame is advantageously adapted to make it possible to view the various interleaved images of the combined image.

The person skilled in the art will adapt in particular the resolution of the electronic imager and/or the second image, and the first image so as to allow the viewing of the various interleaved images of the combined image.

As previously, the presence of several first images can make it possible to authenticate and/or to identify the security article independently of the electronic imager used and in particular independently of its resolution.

The at least partial superposition of the first and second images can make it possible to successively observe the interleaved images of the combined image through a relative motion of the revelation frame with respect to the combined image. It is then possible to authenticate and/or to identify the security article by virtue of the reconstruction of the interleaved images which constitutes at least in part an authentication and/or identification information item for the article.

The reconstruction of the interleaved images can for example bring about the illusion of a motion, especially an animation.

The electronic imager can comprise a screen, for example such as those described previously, whose pixels serve at least partially to form a second image in the form of a revelation frame. The first image advantageously comprises a combined image associated with the revelation frame thus formed at least partially by the pixels of the screen.

In particular, the frame lines and/or dots of the revelation frame may be formed by the pixels of the screen of the electronic imager.

The screen can comprise pixels forming at least two revelation frames of different resolutions. In particular, the screen can comprise two revelation frames with different spacings between frame dots and/or lines and/or different thicknesses of frame dots and/or lines.

The revelation frame may be formed by a succession of multichrome lines formed by pixels of the screen, especially lines comprising pixels exhibiting three cells, red, green and blue (of the RGB type), the pixels being spaced apart from one another so as to form monochrome lines devoid of pixels, especially black in color. The pixels can also exhibit four cells, red, green, blue and yellow.

In this way, the pixels of the screen can make it possible to form an intrinsic revelation frame of the screen without requiring the display of a particular image on the screen. For example, the screen is illuminated in a uniform manner in white, by turning on the red, green and blue cells of all the pixels of the image.

The imager may be used in two ways. In a first case, an image corresponding to a non-homogeneous turning on of the pixels of the imager is displayed. In a second case, all the pixels of the imager are turned on in a homogeneous manner and the innate frame resulting from the arrangement of the cells of the pixels within the imager is utilized.

Thus, the observation of the interleaved images by relative motion of the first image in the form of a combined image with respect to the second image in the form of a revelation frame can make it possible to observe a monochrome animation of the interleaved images according to a first motion of the first and second images with respect to one another, and a multichrome animation of the interleaved images according to a second motion of the first and second images with respect to one another. The second motion takes place in a different direction from the first, preferably perpendicular.

The combined image, and the interleaved images that it comprises, may be framed images, that is to say images whose various gradation levels are obtained by frame dots and/or lines. The framed images can for example be halftone images, making it possible to render especially levels of color, for example of gray, on the basis of groupings of frame dots.

The combined image can correspond to the decomposition of a motion of a pattern, for example of a text, of alphanumeric signs, of ideograms, of an object, of a person and/or of an animal. The interleaved images can represent successive positions and/or successive motions of a pattern, for example of an object, of a person and/or of an animal.

The combined image can advantageously be obtained by superimposing the interleaved images, each representing a position of the pattern.

The interleaved images can represent hidden information, revealed successively by relative motion, in particular by translation, of the revelation frame over the combined image.

Preferably, the combined image preserves recognizable esthetics, especially so as to constitute a first authentication element.

The revelation frame can allow the human eye to view a different interleaved image at one and the same time, the observer's brain being able to reconstruct for example a motion or observe a hidden information item.

Within the meaning of the present invention, the expressions "framed image" and "revelation frame" must be given a broad meaning which covers all the types of frames or pseudoframes, comprising a juxtaposition of mutually contrasting zones, for example of light zones and dark zones, distinguishable from one another, the shape of these light zones and of these dark zones not being limited to a particular shape.

For example, the combined image and/or the revelation frame can comprise a set of dots and/or of parallel or non-parallel lines, whose size and/or mutual spacing are variable or constant, this set forming a succession of light and dark zones, for example white and black zones.

In particular, when the combined image and/or the revelation frame comprise a set of dots disposed for example according to lines and/or columns, the observation of the interleaved images can be done by translation in at least two directions. This entails especially a direction parallel to said lines and a direction parallel to said columns.

The combined image and/or the revelation frame can especially comprise a set of lines, preferably mutually parallel, of defined thickness and mutual spacing. In particular, the lines may have the same thickness and/or the same mutual spacing.

The combined image and/or the revelation frame can for example comprise a succession of dark and light lines, for example black and white lines. The thickness of the dark lines of the combined images is for example equal to the thickness of the light lines of the revelation means. The thickness of the light lines of the interleaved images is for example equal to the thickness of the dark lines of the revelation means.

The revelation frame can comprise opacifying strips with parallel edges, optionally non-rectilinear. The presence of opacifying strips with non-rectilinear edges can render reproduction by a counterfeiter more difficult.

The revelation frame can comprise portions of strips, of substantially identical color or identical to that of the strips of the combined image, and disposed so as to mask certain strips of the combined image to obtain the desired effect.

Preferably, the area, especially the length and/or the width and/or the largest dimension, of the revelation frame may be greater than or equal to the area, especially the length and/or the width and/or the largest dimension, of the combined image. In this way, it is possible to view the entire reconstruction of the motion produced by the relative displacement between the combined image and the revelation frame.

The revelation frame can have an arbitrary shape, for example circular, oval, star-shaped, polygonal, for example rectangular, square, hexagonal, pentagonal, lozenge-shaped, among others.

The security article can comprise a first part of a revelation frame or of a combined image, the electronic imager comprising the other part. The security article and the optical imager can then be placed so as to bring together the two parts of the revelation frame or of the combined image that were separate for the implementation of the method according to the invention.

According to a variant of the invention, it is possible to associate two combined images of different dimensions. The combined image of smaller dimension is in particular repeated, especially according to a network, especially of lines and columns, so as to appear as a background on which the combined image of larger dimension is disposed. The associated revelation frame then comprises a first revelation frame adapted to the combined image of larger dimension, and a second revelation frame adapted to the combined image of smaller dimension. The two different combined images can exhibit similarities and/or supplement one another. They can in particular be identical and/or symmetric.

The first image may be transferred to the security article by a printing method, for example offset, copper-plate, laser, heliogravure, typography or silk-screen printing.

For example, the first image may be printed, for example with colored or non-colored inks, which are visible to the naked eye, under ultraviolet (UV) and/or infrared (IR) light, are opaque or luminescent, especially fluorescent, thermochromic, photochromic, with interferential effect, especially iridescent, or with optically variable effect according to the angle of observation (goniochromatic), especially comprising liquid crystals, metallic or nonmetallic inks, magnetic or nonmagnetic, among others.

The first image can further comprise metallizations and/or demetallizations, of for example aluminum. Advantageously, metallizations and/or demetallizations may be used so as to avoid counterfeiting by printing. In particular, metallizations and/or demetallizations of different colors are preferentially used, for example by means of aluminum and copper.

The first image can comprise a watermark or pseudo-watermark.

The watermarks are produced by techniques well known in the paper-making sector. The pseudo-watermarks reproduce the appearance of a watermark by exhibiting opacity differences, they may be obtained mechanically by supplying pressure with or without supplying heat and/or chemically by applying a composition, for example increasing the transparency of the paper locally by virtue of transparentizing substances. The density of fibrous matter of the pseudo-watermark may be uniform in contradistinction to a conventional watermark.

The first and second images may be colored, especially of different colors.

The first image may be carried by a patch and/or a foil featuring on the security article.

The patch and/or the foil can comprise metallizations and/or demetallizations, of for example aluminum, or any type of printing.

The patch and/or the foil can comprise holographic printings and/or liquid crystals.

The first image can further be carried by a security thread, incorporated at the surface, in the bulk or as window(s) in the security article.

The security thread can exhibit a sufficient width to enable the first image to be made to appear therein in full. The width of the security thread is for example between 3 and 20 mm, and preferably still between 4 and 10 mm.

The first image advantageously appears on a zone of the at least partially transparent article. The first image may be at least partially transparent.

The at least partially transparent zone can correspond to a recess, passing right through or not, of the article where the first image is situated.

The zone consists for example of a translucent overlay paper.

The zone can further comprise or consist of a polymer layer comprising for example polyethylene (PE), polyvinyl chloride (PVC), polyethylene terephthalate (PET), polycarbonate (PC), polyester carbonate (PEC), polyethylene terephthalate glycol (PETG), acrylonitrile butadiene styrene (ABS) or a light collecting film, for example of the "waveguide" type, for example a polycarbonate based luminescent film marketed by the company BAYER under the brand name LISA®. When using a waveguide film, the first image is preferably obtained by laser etching.

The zone can also be rendered transparent by applying a generally fatty composition which renders the zone permanently transparent, such as for example a composition made of oil and of transparent mineral material as described in U.S. Pat. No. 2,021,141, or such as for example a composition in the form of a wax combined with a solvent as described in U.S. Pat. No. 1,479,437.

It is also possible to render the zone transparent by applying a wax locally by hot transfer, as described in U.S. Pat. No. 5,118,526.

It is further possible to use for the zone a fibrous layer comprising a heat-meltable substance, for example polyethylene as described in patent EP 0 203 499, the transparency of which will be made to vary under the local action of heat.

The security article, as well as the elements that it comprises, such as for example the first image, a window, a security thread, a patch and/or a foil comprising or not comprising the first image, can comprise one or more extra security elements such as defined hereinafter.

Among the extra security elements, some are detectable by eye, in daylight or in artificial light, without use of a particular apparatus. These security elements for example comprise colored fibers or flakes, or partially or completely metallized or printed threads. These security elements are what are called level one security elements.

Other types of extra security elements are detectable only with the aid of a relatively simple apparatus, such as a lamp emitting in the ultra-violet (UV) or the infrared (IR). These security elements for example comprise fibers, flakes, strips, threads or particles. These security elements may be visible or invisible to the naked eye, being, for example, luminescent under illumination from a Wood's lamp emitting at a wavelength of 365 nm. These security elements are termed level two.

Other types of extra security elements require a more sophisticated detection apparatus for their detection. These security elements are for example capable of generating a specific signal when they are subjected, simultaneously or otherwise, to one or more external excitation sources. Automatic detection of the signal makes it possible to authenticate, if appropriate, the article. These security elements for example comprise tracers taking the form of active materials, particles or fibers capable of generating a specific signal when these tracers are subjected to optronic, electric, magnetic, or electromagnetic excitation. These security elements are termed level three.

The security article and the elements that it comprises can exhibit security characteristics of first, second or third level.

In particular, the first image may be associated with metallization effects, luminescence effects, for example fluorescence and/or phosphorescence, thermochromic effects (thermochromic ink for example), magnetic effects, polarizing effects (liquid-crystal ink for example), this list being nonlimiting.

The security article may be a means of payment, such as a banknote, a check or a restaurant voucher, an identity article such as an identity card, a visa, a passport or a driver's license, a lottery ticket, a transport pass or an entry ticket to cultural or sports events, or else an access card, for example for zones to which access is restricted.

In particular, the security article may be an access card comprising a first image, for example in the form of a combined image, that the card bearer presents to an access control point, for example of a firm, where the method according to the invention is implemented, for example with the aid of a second image in the form of a revelation frame, to authorize access.

The subject of the invention is further, according to another of its aspects, a security article, especially a security document, for the implementation of the method as defined previously.

The subject of the invention is further, according to another of its aspects, a method for authenticating and/or identifying a security article, especially a security document, comprising a first image and an integrated microcircuit, especially an RFID chip or an optical chip, the method comprising the steps consisting in:

superimposing at least partially the first image of the article with a second image produced by an electronic imager subsequent to a communication between the integrated microcircuit and the electronic imager, observing an authentication and/or identification information item for the security article, especially by relative motion between the first and second images and/or by change of the angle of observation of the first and second at least partially superimposed images.

The subject of the invention is further, according to another of its aspects, a method for authenticating and/or identifying a security article, especially a security document, comprising a first image, the method comprising the steps consisting in:

superimposing at least partially the first image of the article with a second image produced by an electronic imager on the basis of a photo and/or video of the security article, especially of the first image, observing an authentication and/or identification information item for the security article, especially by relative motion between the first and second images and/or by change of the angle of observation of the first and second at least partially superimposed images.

The photo and/or video may be produced with the electronic imager, an image capture device, for example a digital camera, connected to the electronic imager and/or be transferred to the electronic imager, for example from a device for storing data or via a network, such as the Internet.

The subject of the invention is further, according to another of its aspects, a security article comprising a first image superimposable on at least one second image produced by an electronic imager, the first image being defined especially by a first polarizing material.

The first polarizing material may be superimposed on a second polarizing material, the first material preferably being a printing of cholesteric liquid crystals and the second material preferably being a linearly polarizing substrate.

The first image may be defined by a polarizing substrate rendered locally non-polarized so as to form the first image.

The first image may be defined by a printing of a polarizing ink.

The article can comprise several different first images, each first image being superimposable on at least one second image produced by an electronic imager adapted to this first image, the electronic imagers having, especially, different resolutions.

The subject of the invention is further, according to another of its aspects, a security article comprising several different first images, each first image being superimposable on at least one second image produced by an electronic imager adapted to this first image, the electronic imagers having, especially, different resolutions.

The security article may be used in the method as described previously. The characteristics described in conjunction with the method according to the invention can apply to the security article.

The subject of the invention is further, according to another of its aspects, a method for fabricating a first image of an article such as defined previously, in which:

a metallic layer is deposited on an at least partially transparent substrate, an ink or a varnish is applied, especially by printing, coating or deposition, on the metallic layer, this ink or this varnish possibly being colored or matt, so as to form the first image, a selective demetallization is undertaken in the zone or zones not covered by the ink or the varnish.

The choice of the ink or of the varnish may be made so as to be compatible with a demetallization method.

The demetallization method can for example correspond to a soda chemical method making it possible to remove the zone or zones where the metal is not covered by the ink or the varnish.

The demetallization method can further comprise the application of a varnish or ink, that can be matt or colored, having different optical properties from those of the metallic layer.

The ink may be chosen from among colored or non-colored inks, visible to the naked eye, under UV and/or IR light, opaque or luminescent, especially fluorescent, thermochromic, photochromic, with interferential effect, especially iridescent, or with optically variable effect according to the angle of observation (goniochromatic), especially comprising liquid crystals, metallic or nonmetallic inks, magnetic or nonmagnetic inks, among others. Preferably, the ink is fluorescent and/or phosphorescent under UV and/or IR light.

The article can comprise security elements of first level and/or of second level, such as described previously. In particular, the article can comprise security elements in the form of printings and/or of markers, especially thermochromic and/or photochromic.

By virtue of the fabrication method according to the invention, it is possible to observe on a first face of the article a first bright metallic image and on the opposite second face of the article a first image having the appearance of the ink or of the varnish, for example colored or matt.

Figure 2:
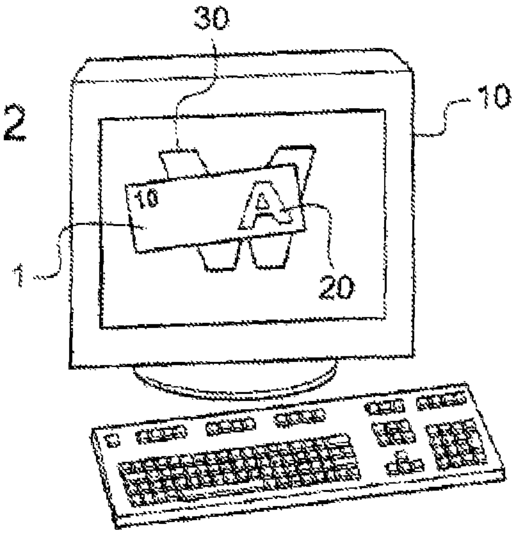
Figure 3:
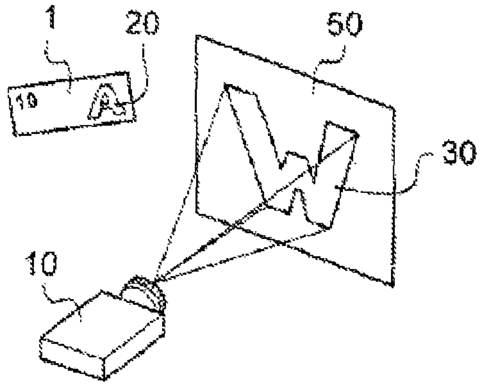
Figure 4:
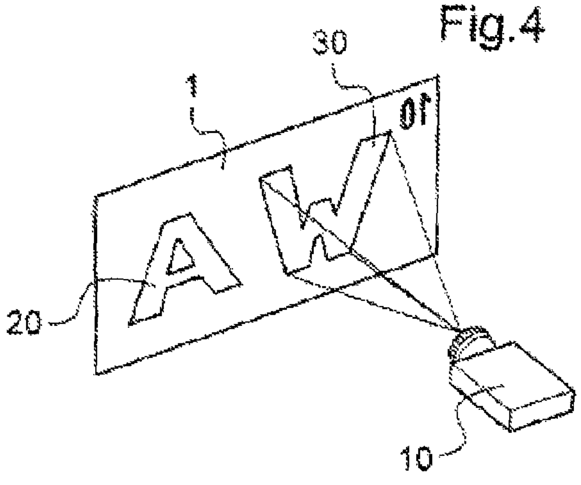
Figure 5:
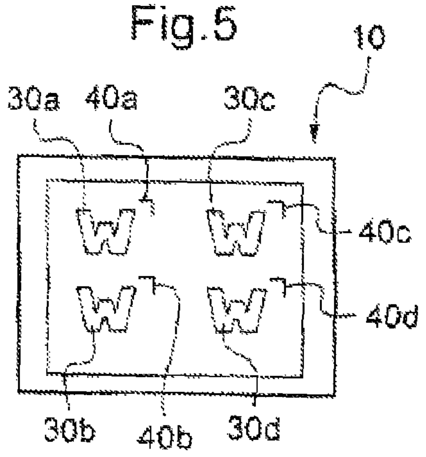
Figure 6:
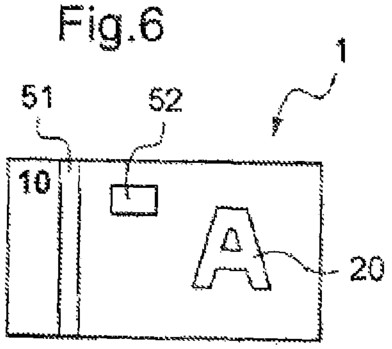
Figure 13:
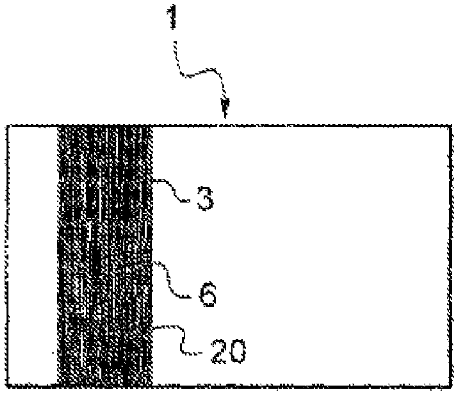
Figure 14:
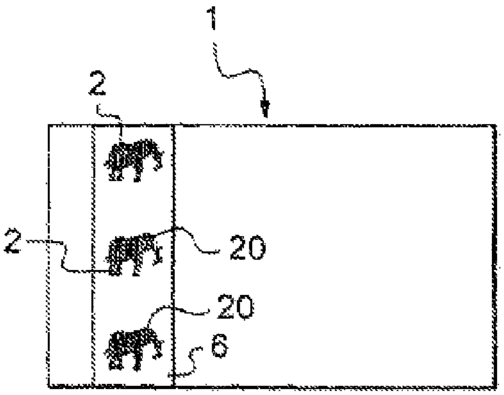
Figure 15:
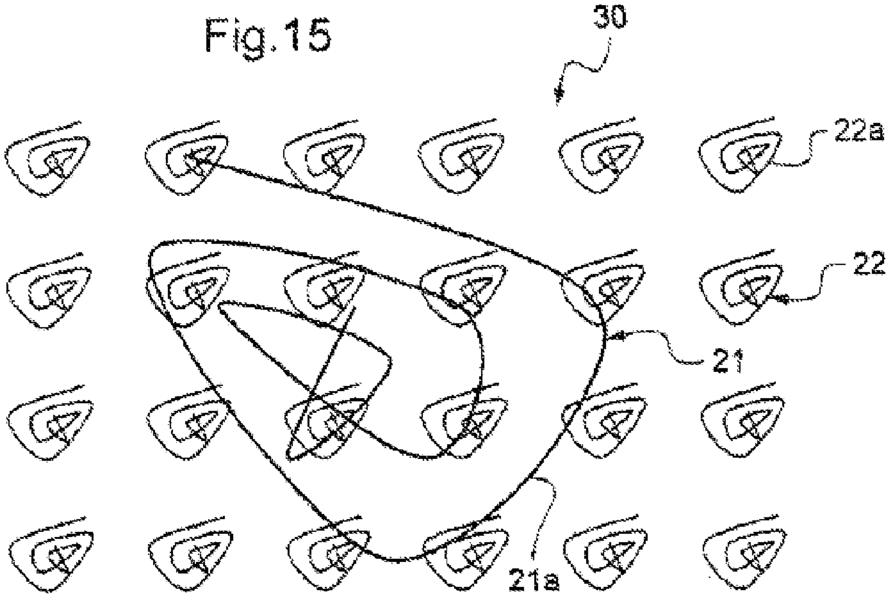
Figure 16:
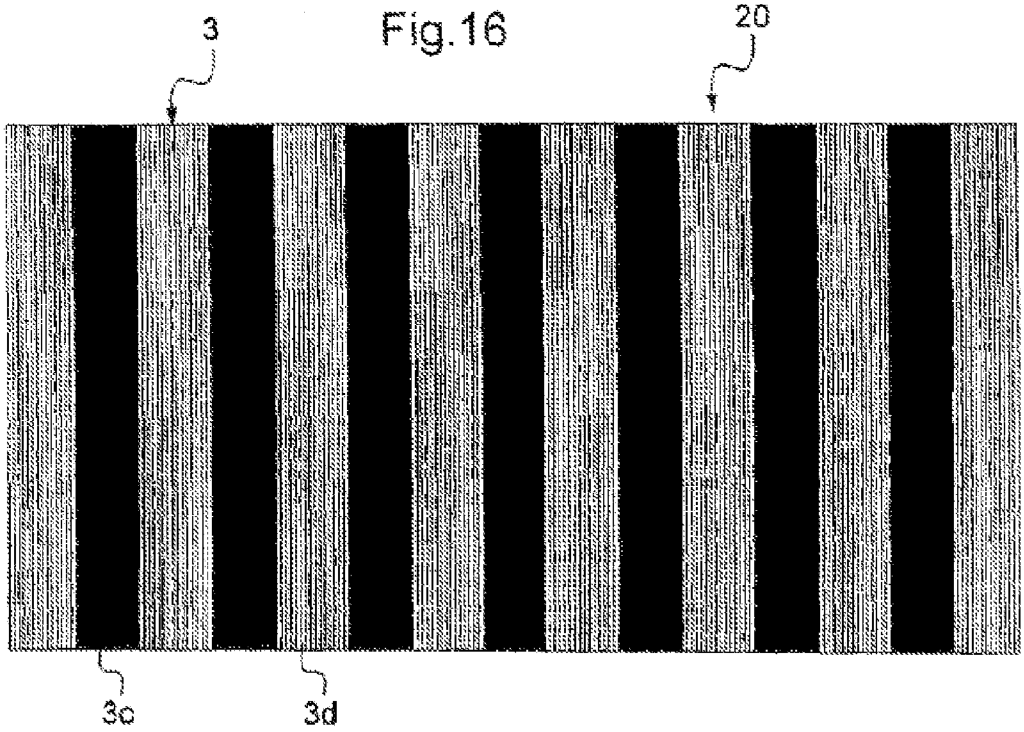
Figure 17:
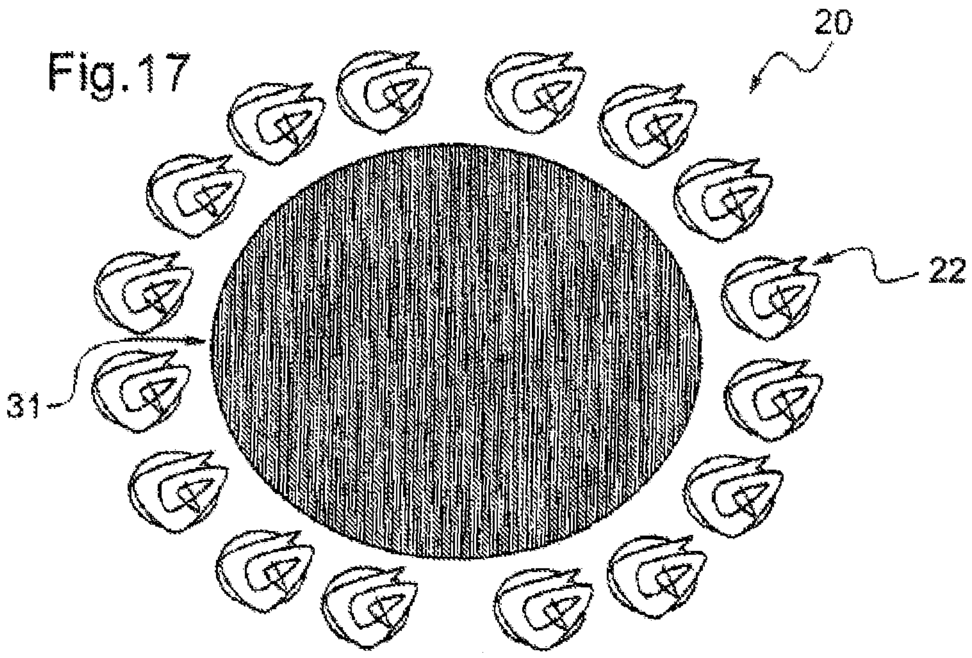
Figure 18:
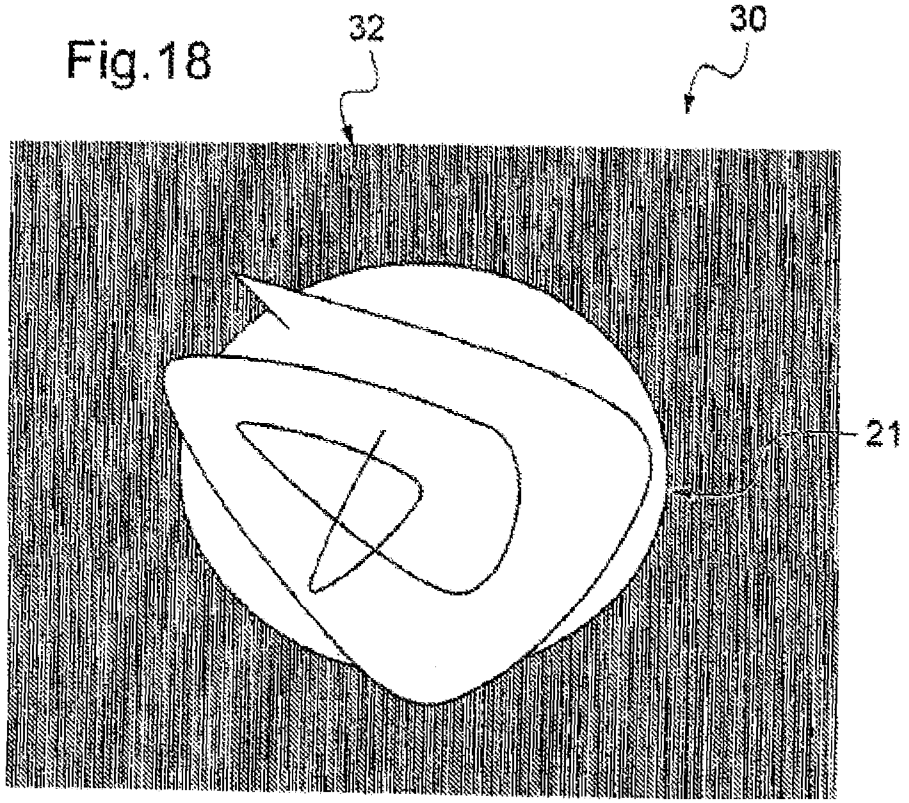
Figure 22:
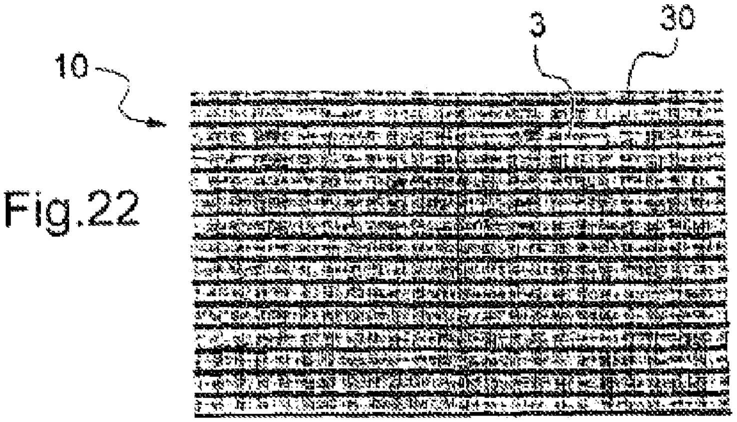
Figure 23:
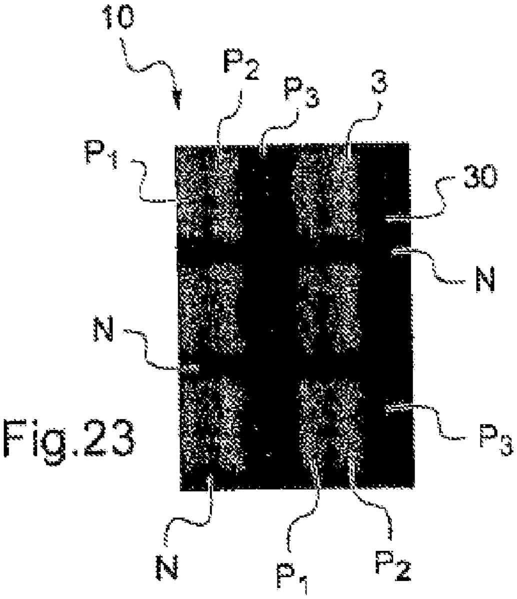
Figure 24:
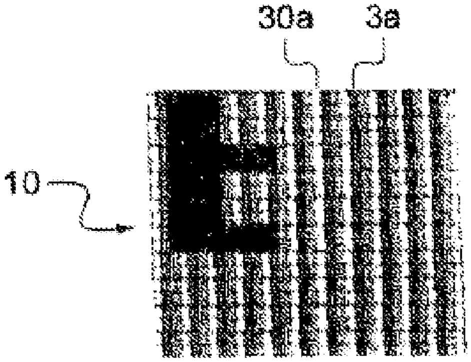
Figure 25:
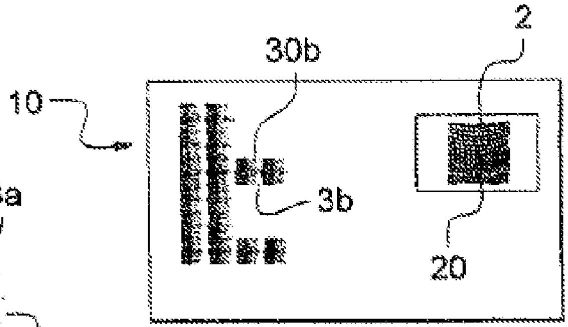
Figure 26:
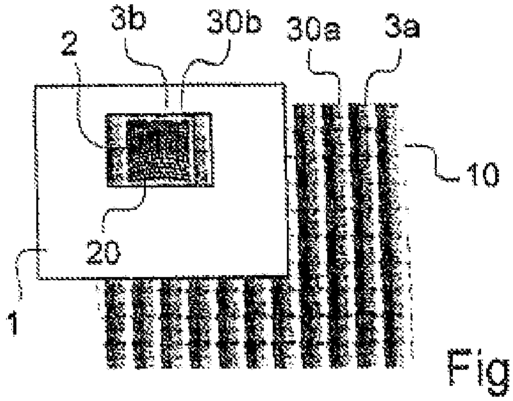

The invention may be better understood upon the reading which will follow, of the description of nonlimiting examples of implementation thereof and on examining the schematic and partial figures of the drawing, wherein:

FIG. 1 represents a block diagram of steps implemented in an exemplary method according to the invention, FIGS. 2 to 4 represent examples of associations of security articles and of electronic imagers for the implementation of an example of the method according to the invention, FIG. 5 represents an exemplary electronic imager displaying indicators, FIG. 6 represents an exemplary security article comprising a security element and an integrated microcircuit, FIG. 7 represents a series of interleaved images making it possible to create a combined image, FIG. 8 represents a combined image obtained on the basis of the series of interleaved images of FIG. 7, FIG. 9 represents an exemplary revelation frame that can be associated with the combined image of FIG. 8, FIGS. 10 to 14 represent exemplary embodiments of security articles comprising a first image in the form of a combined image or of a revelation frame, FIG. 15 represents an example of first image or second image comprising two different combined images for the implementation of an example of the method according to the invention, FIG. 16 represents an exemplary first image or second image comprising a revelation frame for the implementation of an example of the method according to the invention, associated with the combined images of FIG. 15, FIGS. 17 and 18 represent respectively an exemplary first image and an exemplary second image, each comprising both a revelation frame and a combined image, FIGS. 19 to 21 illustrate an exemplary implementation of the method according to the invention, the security article comprising a first image in the form of a revelation frame and the electronic imager producing a second image in the form of a combined image, FIGS. 22 and 23 illustrate another exemplary implementation of the method according to the invention, the security article comprising a first image in the form of a combined image and the electronic imager producing a second image in the form of a revelation frame, FIGS. 24 to 26 illustrate another exemplary implementation of the method according to the invention, and FIGS. 27 to 31 illustrate other examples of implementation of the method according to the invention.

Represented in FIG. 1 is a block diagram relating to steps implemented in an exemplary method according to the invention.

In a first step I, a first image of the security article is superimposed at least partially with a second image produced by an electronic imager.

In a second step II, a relative motion is generated between the first and second images.

Finally, in a third step III, the information item authenticating and/or identifying the security article, which appears during the relative motion between the first and second images, is observed.

The three steps I, II and III may or may not be carried out simultaneously.

Represented in FIGS. 2 to 4 are examples of association between a security article 1 and an electronic imager 10 making it possible to implement such a method.

In FIG. 2, the electronic imager 10 is for example a computer screen on which a second image 30 is displayed.

The security article 1 is for example in the form of a banknote and comprises a first image 20.

The security article 1 is placed on the screen of the electronic imager 10 so as to at least partially superimpose the first image 20 on the second image 30, and then the security article 1 is displaced in relation to the screen of the electronic imager 10 to observe an information item authenticating and/or identifying the security article 1, in accordance with the steps described in FIG. 1.

As a variant, the security article 1 in reference remains stationary with respect to the screen of the electronic imager 10 and the second image 30 is animated with a motion on the screen, for example a translation, for example with the aid of a program activated or not by the user.

In FIG. 3, the electronic imager 10 is for example in the form of a digital projector, projecting a second image 30 onto a background 50, for example the wall of a room.

The security article 1 comprising the first image 20 can then be at least partially superimposed on the second image 30 projected onto the background 50 so as to implement the steps described with reference to FIG. 1.

In FIG. 4, the electronic imager 10 is a projector which projects the second image 30 directly onto the security article 1.

The second image 30 can, as in the example of FIG. 4, be projected, for example in the form of a "W", onto a zone of the security article 1 where the first image 20 is not present. Next, the security article 1 can for example be folded over on itself so as to superimpose the first image 20, for example in the form of an "A", on the second image 30 projected by the electronic imager 10, so as to implement the steps described in FIG. 1. The part of the security article 1 comprising the first image 20 can in particular be folded back over the part comprising the second image 30, this part remaining stationary, in such a way that the second image 30 is situated between the imager 10 and the first image 20.

In a variant, not represented, the second image 30 is projected directly onto the first image 20 of the article 1. In particular, the projection of the second image 30 onto the first image 20 of the security article 1 can then allow an at least partial superposition of the first and second images. Next, the electronic imager 10 is for example displaced in relation to the article so as to implement steps II and III described with reference to FIG. 1.

Represented in FIG. 5 is a variant embodiment in which the electronic imager 10 is a screen displaying several second images 30*a*, 30*b*, 30*c* and 30*d*.

The second images 30*a* to 30*d* can have different properties, for example shapes, colors, dimensions, dots or different frame lines.

Advantageously, the second images 30*a* to 30*d* are differentiated so as to allow one of them at least to be associated with at least one first image 20 present on a security article 1. In this way, it is for example possible to authenticate and/or identify a greater diversity of security articles 1 having different respective first images, corresponding to the various second images 30*a* to 30*d*.

As a variant, the security article 1 comprises several different first images 20, as may be seen for example in FIG. 14, and the electronic imager 10 produces one or more second images 30. In this way, it is for example possible to authenticate and/or to identify a given security article 1 on a greater diversity of different electronic imagers, and especially with electronic imagers having different resolutions. In this way, the two advantages described previously may be brought together.

The electronic imager 10 can display one or more indicators 40*a*, 40*b*, 40*c* and 40*d* making it possible to advise the user as regards the way of positioning the security article 1 with respect to the imager.

In particular, the indicators 40*a* to 40*d* can make it possible to know where to position the top right corner of the security article 1, so as to correctly superimpose a first image 20 of a security article 1 on a second image 40*a*, 40*b*, 40*c* or 40*d* displayed on the screen of the electronic imager 10.

FIG. 6 illustrates the possibility of the security article 1 comprising an extra security element 51 of any known type, for example one of those described previously, for example a luminescent security thread.

Furthermore, the security article 1 can comprise an integrated microcircuit 52, for example an RFID or optical chip, making it possible to communicate with the electronic imager 10 so as to control the display of an indicator such as described previously or to disseminate an information item as regards the way of positioning the first and second images.

Especially in the examples described previously, the first image 20 can comprise a revelation frame 3 and the second image 30 can comprise a combined image 2 comprising at least two interleaved images 2*a*, the combined image 2 being associated with the revelation frame 3, or vice versa, as mentioned above.

The subsequent FIGS. 7 to 26 illustrate this possibility.

Represented in FIG. 7 is a series of interleaved images 2*a* making it possible to create a combined image 2, visible in FIG. 8, representing in this example a pattern in the form of an elephant.

The interleaved images 2*a* correspond for example to four different positions of the elephant and thus make it possible to create a decomposition of the motion of the elephant.

Each interleaved image 2*a* can comprise as illustrated a set of parallel lines, spaced apart in a regular or irregular manner, and exhibiting variable thicknesses.

The images 2*a* are superimposed one above the other so as to form a combined pattern which corresponds to the combined image 2.

Represented in FIG. 9 is an exemplary revelation frame 3 that can be associated with the combined image 2 of FIG. 8.

The revelation frame 3 is for example of rectangular shape and comprises a set of parallel lines, spaced apart in a regular or irregular manner, and having variable thicknesses.

The revelation frame 3 exhibits an area, a length and a width, which are greater than those of the combined image 2, thus enabling all the motions of the elephant to be viewed more easily during the relative displacement between the combined image 2 and the revelation frame 3.

In this example, the combined image 2 and the revelation frame 3 comprise sets of alternately dark and light lines, especially black and white lines, but it could be otherwise. For example, the lines may be colored and be different for the combined image 2 and for the revelation frame 3.

Represented in FIGS. 10 to 14 are exemplary embodiments of security article 1 for the implementation of the method according to the invention.

In FIG. 10, the article 1 comprises a window 4, preferably at least partially transparent, in which the first image 20 appears in the form of a revelation frame 3. The first image 20 can for example be formed by printing, especially copper-plate, metallization or demetallization.

In FIG. 11, the security article 1 comprises a patch 5 in which the first image 20 appears in the form of a revelation frame 3, the patch 5 comprising for example holographic printings.

The patch 5 may be at least partially transparent.

The revelation frame 3 can comprise holographic printings and/or metallizations and/or demetallizations.

Figure 12:
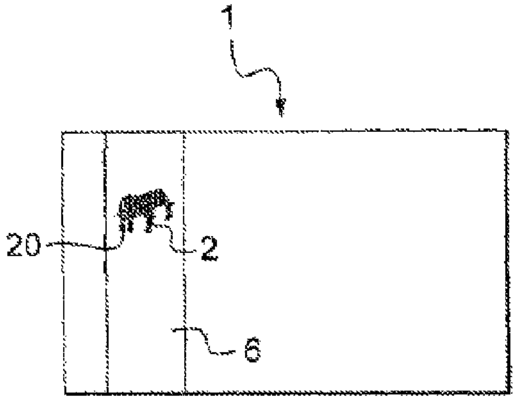

In FIG. 12, the security article 1 comprises a security thread 6 in which the first image 20 appears in the form of a combined image 2.

The security thread 6 can also be at least partially transparent or comprise a partially transparent zone at the level of the combined image 2.

In FIG. 13, the security article 1 comprises a security thread 6 in which the first image 20 appears in the form of a revelation frame 3.

The security thread 6 may be at least partially transparent or exhibit an at least partially transparent zone. The revelation frame 3 can extend from one edge of the security article 1 to the opposite edge.

In FIG. 14, the security article 1 comprises a security thread 6 comprising several first images 20 in the form of combined images 2. The first images 20 are produced in such a way that the security article 1 can be used with different electronic imagers, especially exhibiting different resolutions, each first image 20 being adapted to a given resolution of an electronic imager.

The security thread 6 may be at least partially transparent or comprise at least one at least partially transparent zone, especially at the level of a combined image 2.

The presence of several first images 20 on the security article 1, disposed on a security thread 6, can make it possible to simplify the method for fabricating the security article 1 by incorporating the security thread 6 into a substrate, especially a fibrous substrate. An incorporation with the datum may in particular not be necessary.

In all the examples described previously, the combined images 2 and the revelation frames 3 may be swapped.

The at least partially transparent zones may be situated at the level of the combined images 2 or of the revelation frames 3, or at the level of both at once.

The security thread 6 may be introduced into the security article 1 in a conventional manner, for example at the surface, in the bulk or as window(s).

The combined images 2 and/or the revelation frames 3 can furthermore comprise a polarizing filter. The security article 1 can then be authenticated and/or identified by means of an electronic imager 10 emitting polarized light.

In FIG. 15 is represented in a schematic manner a second image 30 (or a first image) comprising two different combined images 21 and 22. The second combined image 22 is for example a symmetric image of the first combined image 21 after possible modification of its size, so as to obtain a network of combined images 22 organized as rows and columns FIG. 16 represents the corresponding first image 20 (respectively the second image), in the form of a revelation frame 3 of the interleaved images 21*a* and 22*a* represented schematically in FIG. 16. This revelation frame 3 comprises the association of two elementary frames 3*c* and 3*d* making it possible to observe respectively the interleaved images 21*a* and 22*a*. The frame 3*c* comprises for example a succession of black strips alternating with strips of the frame 3*d* consisting of an alternation of white and black lines, with a smaller pitch.

In FIG. 17 is represented in a schematic manner a first image 20 (or second image) in the form of a combined image 22 disposed according to a network of combined images 22 around a revelation frame 31.

In FIG. 18 is represented in a schematic manner the second image 30 (respectively the first image) in the form of a combined image 21 surrounded by a revelation frame 32.

Illustrated in FIGS. 19 to 21 is an exemplary implementation of a method according to the invention.

In this example, the electronic imager 10 takes for example the form of a mobile telephone on which is displayed a second image 30 in the form of a combined image 2 (visible in FIG. 21).

Furthermore, the security article 1 comprises a polarizing filter on which the first image 20 has been formed in the form of a revelation frame 3.

FIG. 20 illustrates the superposition of the security article 1 comprising the first image 20 in the form of a revelation frame 3 on the second image 30 in the form of a combined image 2 produced by the electronic imager 10, the latter emitting polarized light.

The user displaces the security article 1 so as to bring it into a crossed orientation making it possible to observe the opacity of the polarizing filter in relation to the polarized light.

Next, as may be seen in FIG. 21, the security article 1 comprising the revelation frame 3 is displaced by a translation motion along the arrows F with respect to the combined image 2 displayed by the screen of the electronic imager 10, so as to cause the animation of the interleaved images to appear. The displacement takes place while preserving the relative orientation of the frame with respect to the screen.

Such a method makes it possible to authenticate and/or to identify the security article 1 according to several security levels.

The positioning of the revelation frame 3 comprising the polarizing filter according to the orientation making it possible to observe the opacity of the polarizing filter, this observation being visible only on a screen emitting polarized light, for example a screen of the LCD type, affords a first security level.

The revelation of the animation of the interleaved images by displacement of the revelation frame 3 in relation to the combined image 2 affords a second security level.

Represented in FIGS. 22 and 23 is another exemplary implementation of the method according to the invention.

In this example, the electronic imager 10 is preferably a screen, especially of the LCD type, comprising a plurality of pixels.

FIG. 22 partially represents the electronic imager 10 in the form of an LCD screen comprising a plurality of pixels, and FIG. 23 represents a part of FIG. 22 magnified.

The set of pixels of the screen forms the second image 30 in the form of a revelation frame 3.

As may be seen in FIG. 23, the screen can comprise a regular arrangement of pixels disposed in the form of horizontal and vertical lines. In particular, the horizontal lines can comprise a repetition of three pixels $P_1$, $P_2$, and $P_3$, of different colors, for example RGB.

Furthermore, as may be seen in FIG. 23, the horizontal lines of pixels may be separated by zones N black in color devoid of pixels.

In this way, when the combined image 2 of the security article 1 is superimposed on the screen of the electronic imager 10 comprising the revelation frame 3, a relative motion horizontally can reveal a multichrome animation making it possible to observe interleaved images, and after having applied a rotation of 90° to the combined image 2, a relative motion vertically can make it possible to reveal a monochrome animation making it possible to observe said interleaved images.

According to a variant, the combined image 2 and the revelation frame 3 are produced so as to allow the observation of an animation by a relative motion in two different directions, especially perpendicular. Such an effect is for example obtained by means of a revelation frame 3 consisting of rows and of columns of dots, for example of square shape, and of an adapted combined image 2, like that represented in FIG. 25.

The electronic imager 10 can correspond to the screen of a mobile telephone, having for example a resolution of 160 dpi, thus making it possible to obtain a revelation frame whose pixels are spaced 159 μm apart.

The combined image 2 present on the security article 1 can appear in a through window of the security article 1, sealed by a transparent plastic strip. The transparent plastic strip can exhibit circular polarizing filter properties.

The security article 1 comprising the polarizing transparent plastic strip on which the combined image 2 is formed may be fabricated so that the polarization properties are preserved on the constituent zones of the combined image, representing for example several successive positions of a spiral. Accordingly, it is possible to produce the combined image 2 in the manner described previously, for example by printing the plastic strip with a specific ink affording a polarization property or by heating, for example with a laser, the zones required to be devoid of polarizing properties.

Represented in FIGS. 24 to 26 is another exemplary implementation of the method according to the invention.

In this example, the electronic imager 10 in the form of a screen comprises a first part 30*a* of the second image in the form of a revelation frame 3*a*, as may be seen in FIG. 24.

The security article 1 comprises the other part 30*b* of the second image in the form of a revelation frame 3*b*, for example in an at least partially transparent window of the article. Moreover, the security article 1 comprises the first image 20 in the form of a combined image 2, for example in an at least partially transparent window of the article, as may be seen in FIG. 25.

When the security article 1 is folded over on itself so as to superimpose the combined image 2 on the part 3*b* of the revelation frame, and then superimposed on the electronic imager 10 so as to superimpose the combined image 2 and the part 3*b* of the revelation frame on the part 3*a* of the revelation frame formed on the screen of the electronic imager 10, it is possible to implement the method according to the invention by relative motion of the part of the security article 1 comprising the combined image 2 with respect to the part of the security article 1 comprising the part 3*b* of the revelation frame, the latter being stationary in relation to the screen comprising the part 3*a* of the revelation frame so as to allow the reconstruction of the revelation frame and the observation of the interleaved images, as may be seen in FIG. 26. The combined image 2 advantageously allows the observation of an animation or of two animations by a relative motion respectively in two different directions, especially perpendicular.

Represented in FIG. 27 is an exemplary security article 1 in the form of a passport comprising a first image 20, printed in the form of a combined image 2, and an RFID chip 60.

The chip 60 is able to communicate with the electronic imager 10 (not represented) so as to make it possible to produce the second image 30 associated with the first image 20.

In particular, during the method for authenticating and/or identifying the passport 1, the first image 20 is illuminated with the electronic imager. The chip 60 comprises an information item transmitted to the electronic imager which then projects the second image as a function of this information item.

Represented in FIG. 28 is another exemplary implementation of the method according to the invention.

In this example, the security article 1, in the form of a passport, comprises a first image 20 in the form of a combined image 2 obtained by metallization of a transparent plastic film inserted into the passport by way of a window 4.

The passport 1, especially the combined image 2, is photographed and/or filmed by a digital camera 70 belonging or linked to the electronic imager. A recognition program can then make it possible to recognize the combined image 2 and to acquire from a database a second image associated with the first image. The database is for example stored on a secure server. The second image thus obtained is displayed and/or projected by the electronic imager so as to make it possible to authenticate and/or to identify the passport 1 by relative motion of the first and second images.

Represented in FIG. 29 is a security article 1 in the form of a banknote.

The security article 1 comprises a first printed image 20, representing for example the face of a person, this first image 20 comprising a combined image 2, for example at the level of the person's hair. Preferably, the combined image 2 appears in a transparent, translucent or reduced-opacity zone of the security article 1.

To authenticate and/or identify the banknote 1, it is for example possible to photograph the banknote, especially the first image 20, and to produce a second image associated with the first image, this second image being obtained on the basis of the photograph of the banknote.

For example, the electronic imager is a mobile telephone capable of photographing the banknote, and a program internal to the mobile telephone makes it possible to download a second image associated with the first image which may thereafter be displayed on the screen of the mobile telephone to implement the method according to the invention.

According to a variant, said program internal to the mobile telephone makes it possible to generate said second image associated with said first image.

Represented in FIGS. 30 and 31, in section, are two examples of security article comprising luminescent zones.

In FIG. 30, the security article 1 comprises a substrate 80 on which is printed a black opaque layer 81. The substrate 80 is for example entirely covered by the black opaque layer 81.

Moreover, a first luminescent image 20, especially fluorescent and/or phosphorescent, for example in the form of a combined image, is printed on the black opaque layer 81.

The associated electronic imager, not represented, is able to project a second image 30, not represented, onto the first image 20 under ultraviolet (UV) lighting.

In this way, the first image 20 is not observable under normal lighting on account of the presence of the black opaque layer 81. On the other hand, under UV lighting, the first image 20 is observable and it is possible to at least partially superimpose the second image 30 on it, especially in the form of a revelation frame, so as to implement the method according to the invention.

In FIG. 31, the first image 20 is printed with a black opaque ink on a luminescent layer 81, especially fluorescent and/or phosphorescent, itself printed on the substrate 80.

In this example, the first image 20 is visible both under normal lighting and under UV lighting.

The expression "comprising a" is synonymous with "comprising at least one".

The invention claimed is:

1. A method for authenticating and/or identifying a security article comprising a first image, the method comprising:

displaying on an electronic imager a second image produced by the electronic imager or projecting on a background or on the security article a second image produced by an electronic imager, the electronic imager being an electronic device that is independent from the security article, at least partially superimposing the first image of the security article with the second image, and performing a relative motion between the superimposed first and second images so as to make it possible to observe an authentication and/or identification information item for the security article during the relative motion between the superimposed first and second images, and an effect of motion or of animation being observed during the relative motion between the superimposed first and second images.

2. The method as claimed in claim 1, wherein pixels of a screen serve at least partially to form the second image in the form of a revelation frame.

3. The method as claimed in claim 1, wherein the security article comprises a zone which is at least partially transparent, translucent, or of reduced opacity, wherein the zone includes the first image.

4. The method as claimed in claim 3, wherein the zone is at least a partially transparent window.

5. The method as claimed in claim 1, wherein the second image is electronically displayed on a screen.

6. The method as claimed in claim 1, further comprising projecting the second image on a background or on the security article.

7. The method as claimed in claim 1, wherein the relative motion of the first image with respect to the second image is a translation and/or rotation motion.

8. The method as claimed in claim 1, wherein the relative motion is generated by a displacement of an electronic imager and/or by a displacement of the security article.

9. The method as claimed in claim 1, wherein the relative motion is generated by a modification of the second image.

10. The method as claimed in claim 1, wherein the second image is electronically displayed or projected from a liquid crystal display (LCD).

11. The method as claimed in claim 1, wherein the first image and the second image exhibit polarization properties.

12. The method as claimed in claim 11, wherein the second image is produced using a polarized light and the first image comprises a polarizing filter.

13. The method as claimed in claim 1, wherein, prior to the authentication and/or identification information item being observable during the relative motion between the first and second images, the first and second images are positioned in an orientation in which one of the first and second images partially masks the other of the first and second images.

14. The method as claimed in claim 1, wherein the security article comprises several different first images and/or several different second images are electronically displayed or projected.

15. The method as claimed in claim 1, wherein the second image is based on a photo and/or video of the first image of the security article.

16. The method as claimed in claim 1, wherein the relative motion between the first and second images is a physical motion between the security article and an electronic imager displaying or projecting the second image.

17. The method as claimed in claim 1, wherein the effect of motion or of animation is of interleaved images.

18. A method for authenticating and/or identifying a security article comprising a first image, comprising:

displaying on an electronic imager a second image produced by the electronic imager or projecting on a background or on the security article a second image produced by an electronic imager, the electronic imager being an electronic device that is independent from the security article, at least partially superimposing the first image of the security article with the second image, and performing a relative motion between the superimposed first and second images so as to make it possible to observe an authentication and/or identification information item for the security article during the relative motion between the superimposed first and second images, wherein the first image comprises a revelation frame and the second image comprises a combined image including at least two interleaved images, the combined image and the revelation frame being associated with one another.

19. A method for authenticating and/or identifying a security article comprising a first image, comprising:

projecting on a background or on the security article a second image produced by an electronic imager, the electronic imager being an electronic device that is independent from the security article, at least partially superimposing the first image of the article with the second image, the second image being an electronically projected image, the second image being formed independently from the first image, and performing a relative motion between the superimposed first and second images so as to make it possible to observe an authentication and/or identification information item for the security article during the relative motion between the superimposed first and second images.

* * * * *